Dec. 11, 1951 R. S. CLARK 2,577,950

APPARATUS FOR INDICATING AND RECORDING THE PERFORMANCE OF ELECTRICALLY DRIVEN LOCOMOTIVES

Filed March 17, 1948 4 Sheets-Sheet 1

INVENTOR
Robert S. Clark
BY
Pennie Edmonds Morton Barrows
ATTORNEYS

Dec. 11, 1951 R. S. CLARK 2,577,950

APPARATUS FOR INDICATING AND RECORDING THE PERFORMANCE OF ELECTRICALLY DRIVEN LOCOMOTIVES

Filed March 17, 1948 4 Sheets-Sheet 2

INVENTOR
Robert S. Clark
BY
Pennie, Edmonds, Morton & Barrows
ATTORNEYS

INVENTOR
Robert S. Clark
BY
Pennie Edmonds Morton & Barrows
ATTORNEYS

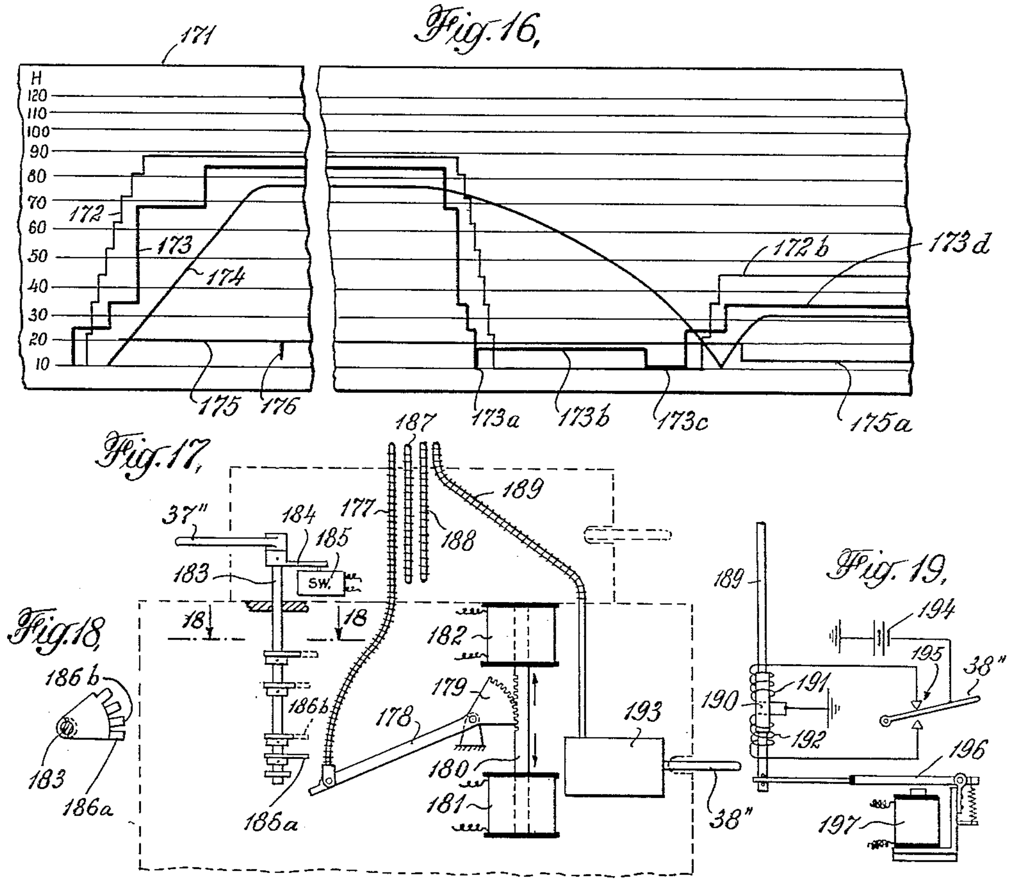
Fig. 16, Fig. 17, Fig. 18, Fig. 19,
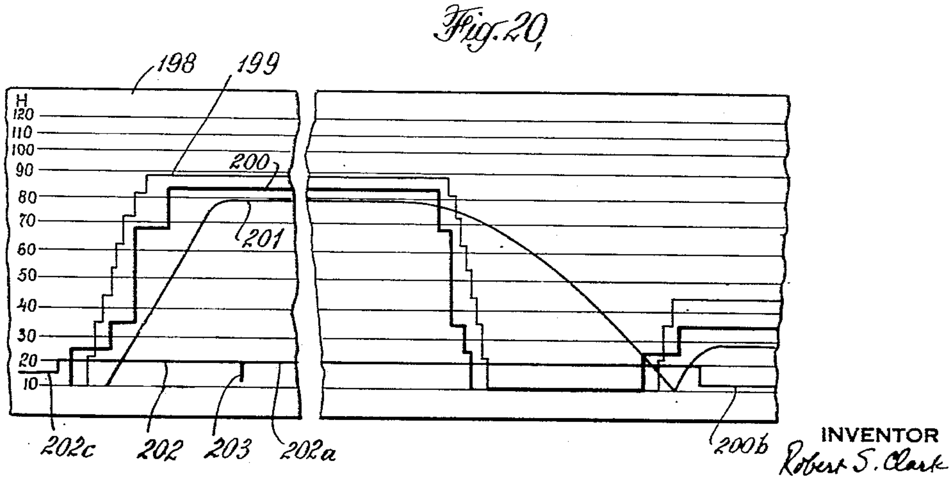
Fig. 20,
INVENTOR
Robert S. Clark
BY
Pennie Edmonds Morton Barrows
ATTORNEYS Patented Dec. 11, 1951

2,577,950

UNITED STATES PATENT OFFICE 2,577,950

APPARATUS FOR INDICATING AND RECORDING THE PERFORMANCE OF ELECTRICALLY DRIVEN LOCOMOTIVES

Robert S. Clark, Albany, N. Y., assignor, by mesne assignments, to F. N. Bard, Chicago, Ill.

Application March 17, 1948, Serial No. 15,404

6 Claims. (Cl. 246—185)

This invention relates to instruments for indicating and recording the details of performance of machine and is concerned more particularly with a novel instrument for making a continuous record of various phases of operation of electrically driven road locomotives, such as speed, throttle position, transition setting, application of the dynamic brake, direction of travel, etc., as well as continuously indicating such features of performance as speed and transition setting expressed in terms of miles per hour or other units. The new instrument produces a record, which enables the reader to analyze the performance of the locomotive and determine whether it was operated during a run to create an overload on the traction motors and, if so, the extent of such overload, and the distance and time, during which the overload continued. The new instrument may be employed to especial advantage on diesel-electric locomotives and a form of instrument for that purpose will be illustrated and described in detail for purposes of explanation, although it is to be understood that the utility of the invention is not limited to that specific application.

Diesel-electric locomotives, as now built, ordinarily include four traction motors, which receive current from a generator operated by the diesel engine. The supply of current to the motors is controlled by the engineer by means of a throttle and the motor connections are capable of variation, so that the motors can be connected together in various circuit arrangements, the changing of the connections being referred to as "transition." The motor circuit that should be effective at any particular time depends on the locomotive speed and, in some locomotives, usually those for passenger service, the transition is automatic. In freight locomotives, the transition is made manually by the engineer by means of a transition lever and, as the locomotive reaches certain speeds, the lever should be manipulated to make a transition, in order to avoid overloading the motors and damaging them or burning them out. In all locomotives, the throttle should be in a position for low current supply, when the locomotive passes over a railroad crossing, since otherwise the vibration is liable to cause poor contact between the brushes and commutators of the motors with consequent arcing and damage. In order, therefore, that it may be determined whether an engineer has correctly operated a locomotive on a particular run, it is necessary that a continuous record be made of speed, throttle position, and, in the case of manual transition locomotives, transition setting.

In locomotive operation, it is desirable that a record be made of the use of the dynamic brake and it is also important to have a record of direction of travel of the locomotive, in order to make it possible to determine whether the locomotive has been operated in accordance with the rules. If the railroad on which the locomotive is operated is equipped with an automatic train stop system, a record should also be made of the use of the mechanism, which may be employed to forestall the automatic operation of brakes by the system, provided the speed be below a selected limit. Such a record of forestalling operations should be coordinated with the speed record so that the two may be examined together.

The present invention is directed to the provision of a novel instrument for providing continuous records of the phases of electric locomotive operation above mentioned, and the new instrument is so constructed as to produce a record sheet, which can be readily examined and from which the conditions of operation at any instant can be quickly determined. In the new instrument, a record tape is advanced from a supply spool to a take-up spool proportionately to the distance traveled by the locomotive, so that each unit of length of the tape will represent, for example, a mile of travel of the locomotive. The various records are inscribed on the tape by means of scribing means, such as pencils, which engage the tape continuously and are moved to different positions transversely of the tape with variations in the subject matter being recorded. One of the pencils is actuated by a mechanism responsive to speed, and a second pencil by appropriate means, which cause the pencil to advance stepwise across the tape, as the throttle is moved from notch to notch to vary the supply of current to the traction motors. In an instrument for use on a locomotive of the manual transition type, a third pencil may be actuated by the transition control mechanism through suitable means, which cause the pencil to be shifted transversely of the tape varying distances, which represent in terms of miles per hour the speed ranges, through which it is permissible to utilize specific motor circuits. If the transition lever of the locomotive is also used to control the application of the dynamic brake, as is customary, the third pencil may be utilized to make a record of such applications. A fourth pencil may be employed to indicate the operation of the forestalling mechanism, such a pencil remaining in a neutral position and drawing a continuous line on the moving tape, until the forestalling mechanism is employed, whereupon the pencil makes a record by being given a quick transverse movement and return to normal position.

The records of direction of travel and of the application of the dynamic brake may be made by various means, such as additional pencils, but preferably not more than four pencils are used and the records made by two of these pencils are altered to indicate direction of movement and application of the brake. For example, direction and the operation of the forestalling mechanism may be indicated by a single pencil, which makes a line on the tape in one of two levels depending on the direction and makes a quick movement and return, when the forestalling mechanism is operated. The records of throttle operation and direction may be thus combined and also the records of transitions and application of the brake. Various methods of producing the combination records will be explained hereafter.

In addition to providing the records above described, the new instrument provides a continuous indication of speed and a form of the instrument suitable for use on a locomotive of the manual transition type may also furnish a continuous indication of the motor circuit in effect at any time and the speed range, through which that circuit should be used. For the purpose of giving such indications, the instrument includes a scale, over which moves a pointer operated by the speed-responsive mechanism, which actuates the pencil making the speed record. A second pointer is mounted to move over the scale and is connected to a part of the transition control mechanism, for example, the manual transition lever. The connections to the second pointer include a cam so formed that, as the transition lever is moved from one notch to the next, the pointer is shifted along the scale to indicate the speed of the locomotive, at which the next transition should be made. The movements of the two pointers are at the same rate per unit of speed and, by reference to the scale, the engineer can immediately determine whether or not a transition is required.

As indicated above, the new instrument, in its preferred form, is so constructed as to indicate to the engineer the approved method of operation of the locomotive and to make a record of all features of operation, which are important in providing a basis for determining whether the locomotive has been operated properly and in accordance with the rules and for protecting the railroad against unwarranted claims for personal injury and property damage. For some purposes, however, records of all the phases of operation above mentioned may not be desired, in which event, the instrument may be simplified by the elimination of one or more pencils.

For a better understanding of the invention, reference may be had to the accompanying drawings, in which:

Fig. 16 is a plan view of a typical record sheet made by the instrument of Fig. 14;

Fig. 17 is a diagrammatic elevational view showing the driving mechanism for another modified form of the instrument;

Fig. 18 is a view on the line 18—18 of Fig. 17;

Fig. 19 is a diagrammatic view of a modified form of dual actuating means for one of the pencils of the instrument;

Fig. 20 is a plan view of a typical record sheet produced by the instrument of Fig. 17.

Figure 1:
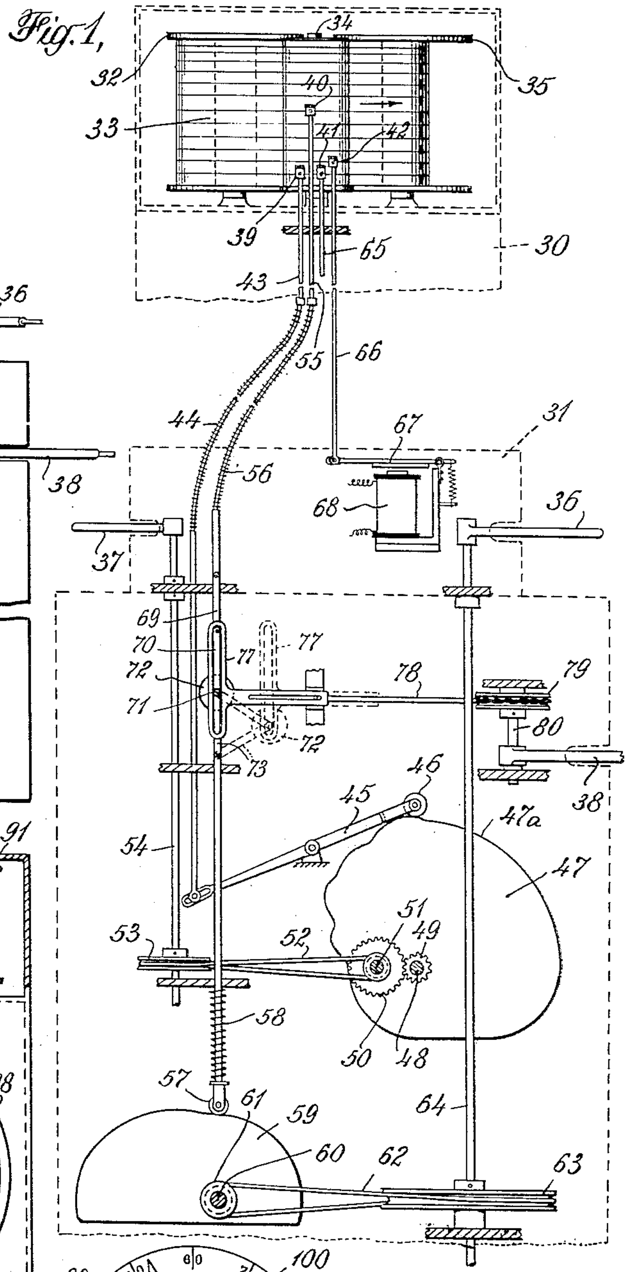
Fig. 1 is a diagrammatic elevational view illustrating a form of the new instrument for recording purposes only.

The instrument shown in Fig. 1 is for use on a diesel-electric locomotive and it provides continuous records of speed, supply of current to the traction motors, transitions, direction of movement, operation of the dynamic brake, and operation of the mechanism for forestalling the automatic application of the brakes by wayside devices. The instrument also provides continuous indications of speed and the motor circuit in effect, the latter indication being in terms of speed and showing at all times the top of the speed range in which a particular circuit should be used.

The instrument shown in Fig. 1 includes a casing 30, which is mounted in the cab of the locomotive in such position as not to obstruct the view of the engineer past the instrument and ordinarily above and forward of the control stand 31. The casing contains a supply spool 32 for a recording tape 33, which passes from the supply spool around a registration and drive roll 34, which may be driven from a convenient part of the locomotive, so that the tape is advanced proportionately to locomotive travel. For this purpose, roll 34 may be driven by a wheel in contact with the tread of a driving wheel of the locomotive. From the registration roll, the tape passes to a take-up spool 35, which is driven through a slipping connection, so that the tape leaving roll 34 will be wound tightly on the spool. The casing has a window, through which the tape may be observed, and records are inscribed on the tape by a plurality of pencils as the tape advances.

The supply of current to the motors of the locomotive is controlled by a throttle 36. The transition are made by a transition lever 37 and the forward and reverse movement of the locomotive is controlled by a reverse lever 38. The throttle and the two levers extend through openings in the wall of the control stand and they are moved stepwise through arcs and may be held in a notch at the end of each step. The movement of the throttle to vary the current supply may include eight running steps and the transition lever may be moved, for example, to four different notches to effect four transitions. In some locomotives, the transition lever may be moved in the opposite direction from its starting or neutral position to cause the dynamic brake to be applied. The reverse lever is moved one step in either direction from a neutral position.

The tape 33 is ruled longitudinally with parallel lines representing increments of speed, for example, ten miles per hour, and the instrument illustrated is equipped with four pencils 39, 40, 41, 42, which are mounted in front of roll 34 and bear against the tape to make records thereon. Each pencil is attached to a shaft which is in turn connected to the device, the operation of which is to be recorded.

Pencil 39 is used to record the transitions and this pencil may be moved by any suitable means, as, for example, electrical means brought into action as the different motor circuits are established. In the instrument shown, the pencil is actuated mechanically by means operatively connected to the transition lever and, for this purpose, the shaft 43 of the pencil is connected by a flexible shaft 44 to one end of a lever 45. The other end of the lever carries a roller 46 bearing against a cam 47 on a shaft 48. Shaft 48 carries a gear 49 meshing with a gear 50 on a shaft 51, which is driven by a belt 52 trained about a pulley 53 on a shaft 54 connected to the transition lever 37.

The cam 47 is so formed that, as the transition lever is moved from notch to notch to effect transitions, pencil 39 is moved transversely across the tape in steps varying in length with the length of the speed range, in which a particular motor circuit should be used. The speeds, at which transitions should be made, depend on the locomotive on which the instrument is to be used and the cam is appropriately formed for the purpose. For example, when the transition lever is moved to the first notch, pencil 39 may move across the tape from the zero position to a point representing twenty-four miles per hour, as indicated by the rulings on the tape, this speed being the top speed at which the first motor circuit should be employed in the particular locomotive. When the second transition is effected, the pencil 39 may be moved across the tape to a point representing thirty-four miles per hour, and, in the third step of the pencil, it may be moved to a point representing sixty-eight miles per hour, these speeds being the top speeds, at which the second and third motor circuits, respectively, should be used. When the pencil is moved to the fourth step, it indicates the speed, for example, eightly-three miles per hour, beyond which the locomotive should not be driven.

The pencil 40 in the instrument shown makes a record of current supplied to the traction motors and the pencil may be moved across the tape by any suitable means in accordance with changes in the current supply. In the instrument illustrated, the pencil is moved by means actuated by the throttle 36 and the shaft 55 of the pencil is connected to one end of a flexible shaft 56, the other end of which carries a roller 57 held by a spring 58 against the surface of a cam 59 on a shaft 60 connected to the throttle 36. The connection may include a pulley 61 on shaft 60 and a belt 62 trained about pulley 61 and about a pulley 63 on a shaft 64 connected to the throttle. As the throttle is moved stepwise through its arc, cam 59 rotates and moves shaft 56 endwise by steps and thus changes the position of pencil 40 transversely of tape 33. For convenience in reading the record of current supply, it is desirable that the movement of pencil 40 in the first few steps be somewhat longer than in the later steps and this result may be achieved by giving the cam 59 an appropriate form.

Figure 3:
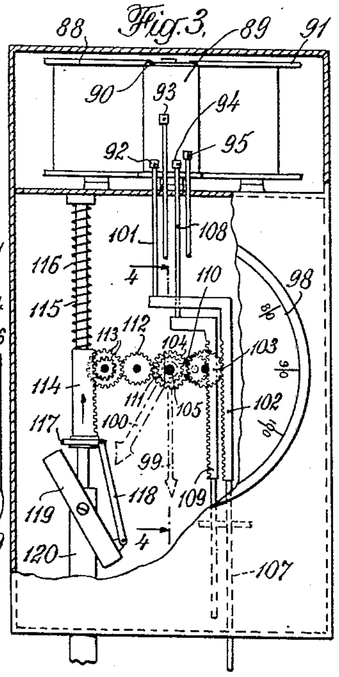
Fig. 3 is a vertical sectional view through the case of the instrument of Fig. 2, showing one type of speed-responsive mechanism that can be employed.
Figure 4:
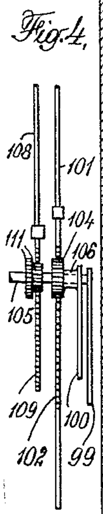
Fig. 4 is a sectional view on the lines 4—4 of Fig. 3.

The pencil 41 records the speed of the locomotive and the shaft 65 of the pencil is driven by speed-responsive means. Suitable speed-responsive means for the purpose are illustrated in Figs. 3 and 22, and will be described hereafter.

The pencil 42 is employed for the purpose of making a record of the use by the engineer of mechanism for forestalling the automatic application of brakes by wayside devices in an automatic train stop system. The shaft 66 of the pencil is connected to the armature 67 of an electromagnet 68, which is momentarily supplied with current whenever the forestalling mechanism is actuated. The energization of electromagnet 68 cause the armature 67 to be drawn down quickly and then released and the movement of the armature causes the pencil to make a short transverse movement and return relative to the tape. Ordinarily pencil 42 makes a straight line record on the tape and the transverse movements referred to cause it to make a short line at right angles to the normal record line.

The instrument so far described makes continuous records of current supply, transitions, speed, and operation of the forestalling mechanism. It is further desirable to make a record of the direction of travel of the locomotive and, while this could be accomplished by the use of an additional pencil, actuated, for example, from the reverse lever, it is preferable to record the direction of travel by suitably modifying the record made by one of the four pencils described. In the instrument shown in Fig. 1, the record of current supply is thus modified. For this purpose, pencil 40 is mounted so that, in its neutral position, it lies at a level about one-quarter of the width of the tape upwardly from the lower edge. When the reverse lever is moved to a position for forward travel of the locomotive, the pencil is shifted to the middle of the tape, and, thereafter, as the throttle is moved, the pencil makes a record above the median line of the tape. When the reverse lever is moved to a position for reverse travel of the locomotive, the pencil is shifted toward the lower edge of the tape and, during reverse travel, makes a record below the median line of the tape. Accordingly, it can be immediately determined from an inspection of the tape whether the locomotive travel is forward or reverse.

Figures 9, 10:
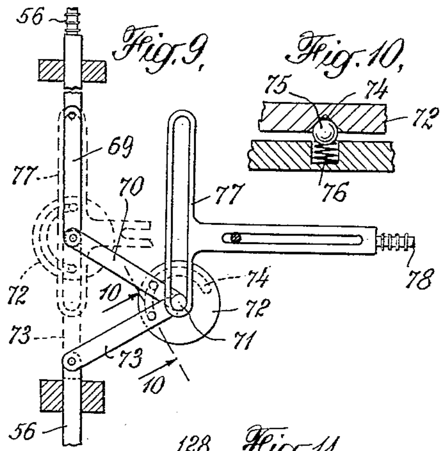
Fig. 9 is a view in elevation of a connection that may be used in the instrument.
Fig. 10 is a sectional view on the line 10—10 of Fig. 9.

The means for shifting pencil 40, so that it will record above or below the median lines of the tape, acts on the flexible shaft 56, by which the pencil is driven, to lengthen or shorten the overall length of the shaft (Fig. 9). For this purpose, a part of shaft 56 between its ends is removed, and a link 69 is rigidly attached at one end to the end of one part of the flexible shaft. The link is in turn connected at its other end to one end of a link 70, the other end of which carries a pin 71, to which a disc 72 is rigidly attached. Beyond the opposite face of disc 72, one end of a link 73 is connected fast to pin 71 and the other end of link 73 is loosely connected to the end of the second portion of shaft 56. Disc has an arcuate channel 74 in one face and the channel has depressions at opposite ends. A ball 75 lies in the channel and is held against the bottom thereof by a spring 76 seated in a recess in the link 70. When the ball seats in the depression at either end of the channel 74, it tends to hold link 70 against movement relative to disc 72 and link 73.

The pin 71 enters a slot in a link 77 supported for guided rectilinear movement and attached by a flexible shaft 78 to the rim of a pulley 79 (Fig. 1) on a shaft 80 connected to the reverse lever 38. When the lever is moved to cause forward movement of the locomotive, rotation of its shaft 80 causes link 77 to move toward the axis of shaft 56. This causes links 70 and 73 to be moved into alignment and the links are held in that position by ball 75 entering a depression at one end of the channel 74 in disc 72. When links 70 and 73 are thus aligned, the overall length of shaft 56 is increased and pencil 40 is moved to a position opposite the median line of the tape, as shown in Fig. 1. When the reverse lever is moved to neutral position, the overall length of shaft 56 is reduced and the pencil 40 is moved toward the lower edge of the tape. When the reverse lever is moved to the position for reverse travel of the locomotive, link 77 is moved to cause links 70 and 73 to assume the angular relation shown in Fig. 9. As a result, the overall length of shaft 56 is reduced and pencil 40 is moved to a point near the lower edge of the tape. Accordingly, with the construction described, the movement of the reverse lever changes the initial position of pencil 40 with reference to the tape and, thereafter, as the current supply is varied by the throttle, cam 59 acts on shaft 56 to cause the pencil to move transversely of the tape to record the variations in current supply either above or below the median line of the tape, depending on the direction of travel.

It is common practice to provide a diesel-electric locomotive with a dynamic brake and, since the brake is applied only after the transition lever has been returned to its initial starting position, the lever may be used to control the brake. The pencil 39, by which the transitions are recorded, may, accordingly, be employed to make a record of the operation of the brake. For this purpose, the cam 47 is formed with a surface 47*a* such that, when the transition lever is moved rearwardly from its initial starting position, the cam acts through the connections described to move the pencil 39 upwardly a short distance above its starting position. Throughout the time that the dynamic brake is in use, the pencil makes a straight line along the tape in this upper level.

Figure 2:
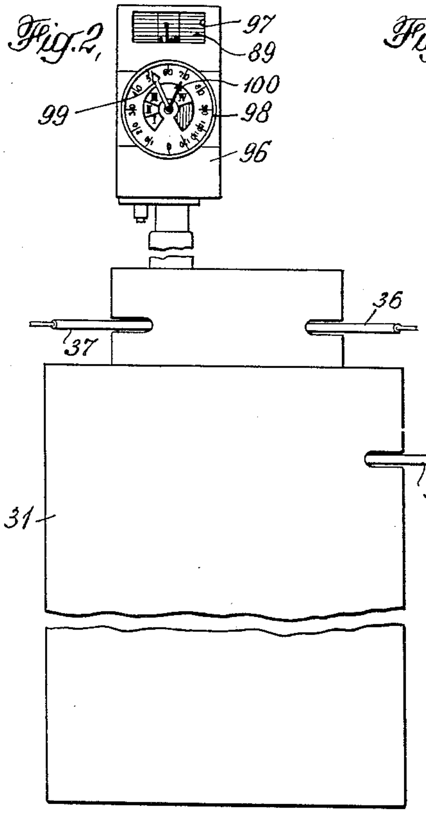
Fig. 2 is a view in front elevation of a form of the new instrument for indicating and recording purposes mounted above the control stand of a diesel-electric locomotive.

The instrument illustrated in Figs. 2 and 3 is used for both recording and indicating purposes, and it includes a spool 88 for holding a supply of a record tape 89, which passes over a registration and guide roll 90 and is taken up on a spool 91. The instrument includes a pencil 92 for recording transitions, a pencil 93 for recording current supply and direction of travel, a pencil 94 for recording speed, and a pencil 95 for recording the actuation of the forestalling mechanism. Pencils 93 and 95 may be driven by the same means used for driving pencils 40 and 42, respectively, of the Fig. 1 instrument.

Figure 5:
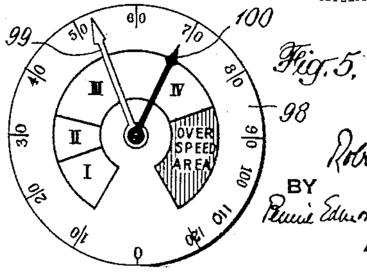
Fig. 5 is a view in front elevation of a dial used in one form of the new instrument.
Figure 6:
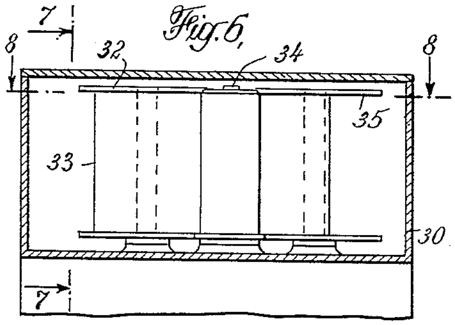
Fig. 6 is a vertical sectional view through a part of the new instrument with the recording devices removed.
Figure 7:
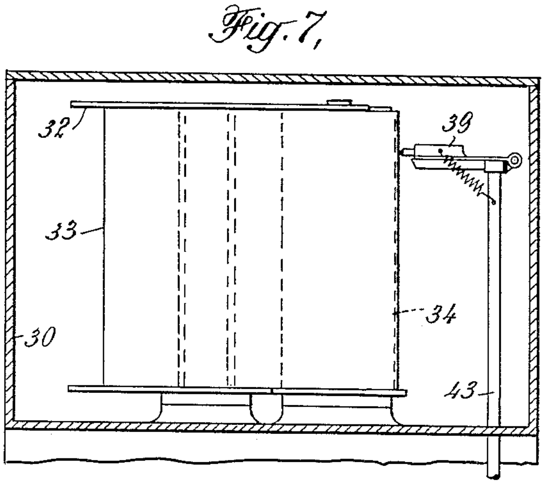
Fig. 7 is a sectional view on the line 7—7 of Fig. 6, showing one pencil in operative position.
Figure 8:
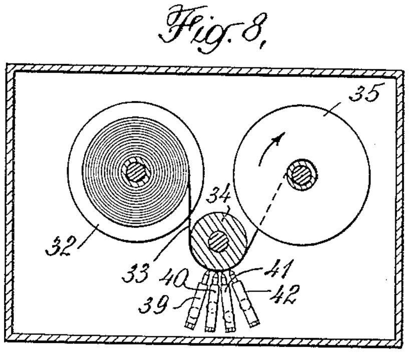
Fig. 8 is a sectional view on the line 8—8 of Fig. 6, showing four pencils in operative position.

The instrument of Fig. 2 includes a casing 96 having a window 97, through which the tape 89 and the ends of the several pencils are visible. Below the window, the casing is provided with a dial 98, the outer portion of which is marked in units of speed, while the central area is divided into sections, each of which covers a speed range, in which a particular motor circuit should be used. The dial illustrated in Fig. 5 is for use on an instrument to be employed on a locomotive, in which the first motor circuit is to be used up to twenty-four miles per hour, the second between twenty-four and thirty-four miles per hour, the third between thirty-four and sixty-eight miles per hour, and the fourth between sixty-eight and eighty-three miles per hour. The radial lines defining each section of the inner portion of the dial are, accordingly, aligned with the appropriate readings on the outer portion of the dial. The instrument includes a pointer 99 moving over the dial to indicate instantaneous values of speed and a second pointer 100, which is moved when a transition is made, and shifts along the dial to indicate the top of the speed range, in which the motor circuit established by that transition should be used.

Pencil 92, which indicates transitions, is connected by its shaft 101 to a member 102 having rack teeth engaging an idler gear 103, which meshes with a gear 104 loosely mounted on a shaft 105. The gear 104 has a hub 106, which projects through dial 98 and carries a pointer 100 at its outer end. Member 102 is connected to a flexible shaft 107, which may be driven from the transition lever 37 in the same manner as shaft 44 of pencil 39.

The speed pencil 94 has a shaft 108 connected to a member 109 having rack teeth. The teeth on member 109 mesh with the teeth of an idler gear 110, which mesh with the teeth on the small part of a compound gear 111 fast on shaft 105. Shaft 105 extends through the hub 106 of gear 104, and the outer end of shaft 105 carries the speed pointer 99. The large part of gear 111 meshes with an idler gear 112, which meshes with the large part of a compound gear 113. The small part of gear 113 is driven by rack teeth on a sleeve 114 mounted for axial movement along a rod 115 against the action of a spring 116, the sleeve being held against rotational movement relative to the rod. Sleeve 114 rests on a collar 117 encircling rod 115 and connected by a link 118 to a governor ring 119 pivotally secured to a shaft 120, which is driven at a rate proportional to the speed of the locomotive, as, for example, from a wheel bearing on the tread of one of the locomotive driving wheels. As the speed of the locomotive varies, the governor ring 119 is acted on centrifugally and moves collar 117 and sleeve 114 up or down. The movement of sleeve 114 is transmitted through the gearing to shaft 105 and causes the speed pointer 99 to move over the dial and pencil 94 to move transversely of the tape.

Figures 13, 14, 15:
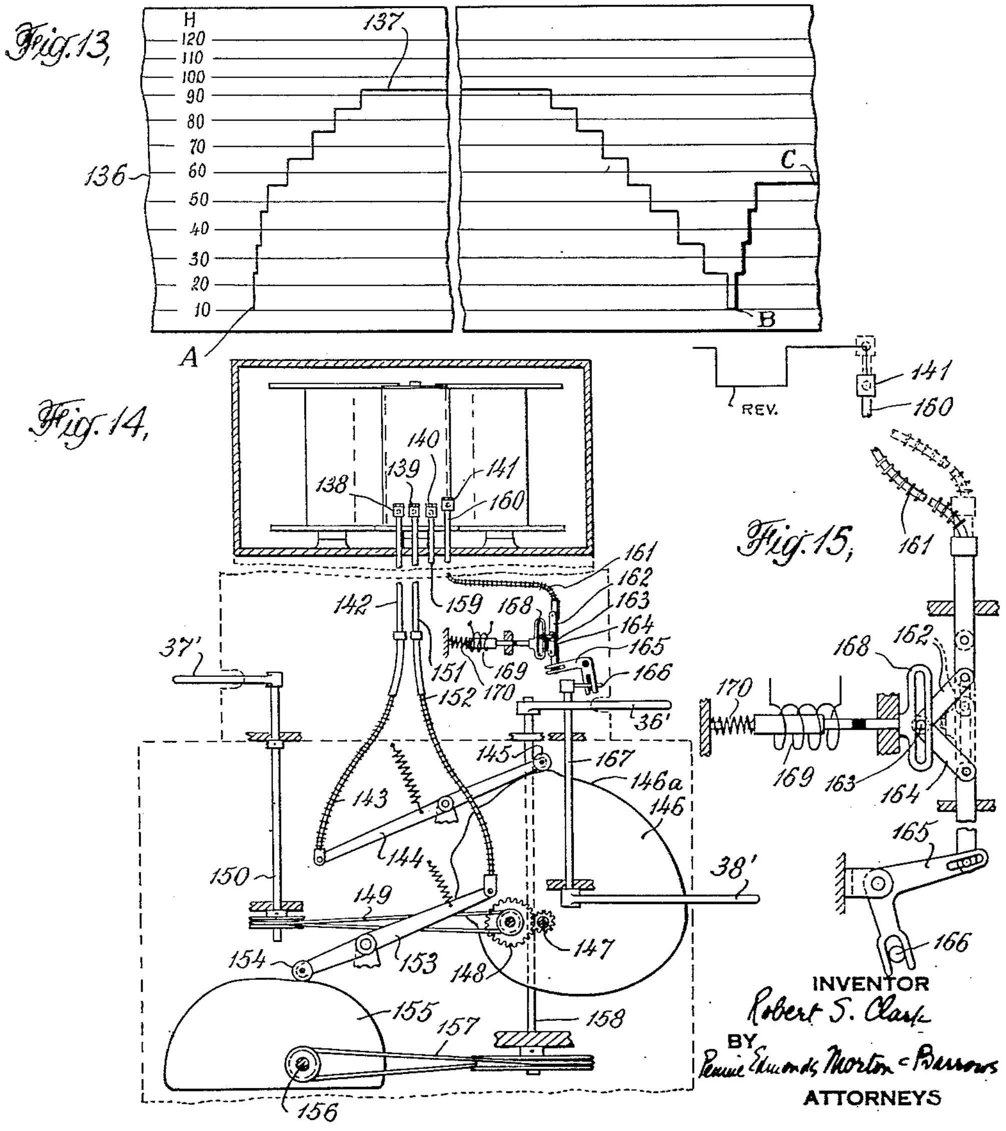
Fig. 13 is a plan view of a record sheet, showing a typical record made by the pencil shown in Fig. 11.
Fig. 14 is a diagrammatic elevational view showing a modified form of the new instrument and driving means therefor.
Fig. 15 is a view in elevation, on an enlarged scale, of a part of the instrument shown in Fig. 14.

The length of tape 121 shown in Fig. 13 carries typical records made by the instrument of Fig. 1 of current supply, transitions, speed, operation of the forestalling mechanism, direction of travel, and application of the dynamic brake. Line 122 is a record of current supply and direction of travel and it was made by pencil 40. When the reverse lever of the locomotive was moved for forward travel, the pencil was shifted to about the mid-point of the tape and the pencil was then moved transversely of the tape toward the upper edge in successive steps as the throttle was opened notch by notch. Subsequently, the throttle was closed in successive steps and the portion 122*a* of line 122 indicates travel of the locomotive with no power on. Thereafter, the locomotive was stopped and reversed, and the movement of the reverse lever for this purpose caused the pencil to be shifted down to a point near the lower edge of the tape. As the throttle was opened for reverse travel, the pencil was moved upwardly across the tape, until it reached the level 122*b*, indicating that the throttle had been shifted to the third notch and retained there during the reverse travel.

The lines 123 and 124 on the tape 121 are records of transitions and speed, respectively, and they show that, as the speed increased, transitions were properly made at twenty-four, thirty-four, and sixty-eight miles per hour. When the locomotive was to be stopped, the transitions were made successively and at short intervals, until the transition lever reached its initial starting position, as indicated by the line 123 reaching the point 123*a*, which is in the same level as the starting point of the line. Thereafter, the dynamic brake was applied and the pencil was shifted to record in the level 123*b*. When the locomotive speed dropped to about thirty-five miles per hour, the transition lever was brought back to its original starting position to discontinue the application of the dynamic brake and the pencil moved back to the point 123*c*. The short line 123*d* was formed by the transition pencil while the locomotive was being stopped by the air brakes with the transition lever in its initial starting position. During reverse travel, two transitions were made, as shown by the portion of the line 123 beyond the heavy line 123*e*.

The line 125 on tape 121 is a record of operation of the forestalling mechanism. The line was made by pencil 42 and, whenever the forestalling mechanism was actuated, the pencil was caused to move downward quickly and be returned, thus making a short line 125*a* extending at right angles to line 125.

Figure 11:
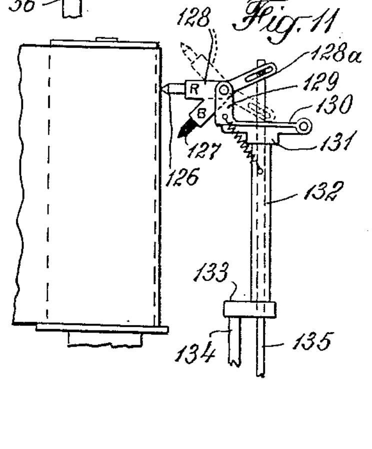
Fig. 11 is a view in side elevation of a device, by means of which pencils of different colors may be used alternately, so that a single line on the record sheet will provide a record of two phases of operation of the locomotive.

The modification of the record made by a pencil actuated by one device on the locomotive in order to record the operation of another device may be effected in other ways than by causing the pencil to record on different parts of the tape, as in the instrument shown in Fig. 1. Thus, a pair of pencils of different colors may be carried by the same mounting, with one or the other of the pencils making a record of the operation of one device and a change in color of that record recording the operation of the second device. Such a construction is shown in Fig. 11 as including a pair of pencils 126, 127 of different color mounted in a holder 128 pivotally supported on a bracket 129 on a plate 130 hinged to a base 131 attached to one end of a tube 132. The tube carries a collar 133, which may be engaged, for example, by a shaft 134 actuated by a cam rotated by the throttle, in the same manner as shaft 56. The plate 130 has an opening in alignment with tube 132 and the holder 128 has a tail 128*a* overlying the opening. A rod 135 projects through the tube and plate and is connected by a slot and pin connection to tail 128*a*. The rod may be operatively connected to a flexible shaft or other means, so as to be moved endwise by a device, the actuation of which is to be recorded.

If the pencils 126, 127 are to record both supply of current and direction of travel of the locomotive, for example, the shaft 134 is moved endwise by means operated as the current supply changes, as, for example, by a cam similar to cam 59 and rotated stepwise as the throttle is moved from notch to notch. The rod 135 is connected to the reverse lever, and, when the lever is in position for forward travel of the locomotive, the rod is moved to elevated position and swings holder 128, so that pencil 126 bears against the record sheet. When the direction of travel of the locomotive is reversed, rod 135 is moved down to swing pencil 127 to operative position. The records of current supply during forward and reverse travel are, accordingly, made in different colors.

The length of tape 136 (Fig. 13) shows a typical record made by the device shown in Fig. 11. The line 137 on the tape indicates values of current supply and that part of the line between points A and B is in one color and shows that the locomotive was traveling forward. That portion of the line between points B and C is in a different color and shows that the travel of the locomotive was in reverse.

The instrument shown in Fig. 14 is a modification of that shown in Fig. 1 and provides records of current supply, transitions, speed, direction of travel, operation of the forestalling mechanism, and operation of the dynamic brake. The six records are made by four pencils designated 138, 139, 140, 141.

Pencil 138 records the transitions and the application of the dynamic brake. The shaft 142 of the pencil is connected by a flexible shaft 143 to one end of a lever 144, the other end of which carries a roller 145 bearing against the rim of a cam 146. The cam is mounted on a shaft 147 connected through gearing 148 and a belt 149 to a shaft 150, which is connected to the transition lever 37′. As the lever is moved to effect the successive transitions, cam 146 is moved angularly by steps and shifts pencil 138 corresponding distances upwardly across the record sneet. Cam 146 is provided with a surface 146*a*, so that, when the transition lever is moved rearwardly from its initial starting position to apply the dynamic brake, surface 146*a* causes a movement of pencil 138 to make a record above the level of its starting point.

Pencil 139 records current supply and its shaft 151 is connected by a flexible shaft 152 to one end of a lever 153, the other end of which carries a roller 154 in contact with the rim of a cam 155. The cam is mounted on the shaft 156, which is connected through a belt 157 to a shaft 158 connected to the throttle 36′. As the throttle is opened notch by notch, cam 155 is moved angularly stepwise and this causes a step by step movement of pencil 139 transversely of a record tape.

The pencil 140 records speed and its shaft 159 may be actuated by any appropriate speed-responsive mechanism, such, for example, as that illustrated in Fig. 3.

The pencil 141 records direction of travel and also the operation of the forestalling mechanism. The shaft 160 of the pencil is connected to a flexible shaft 161, which is attached to one end of a link 162, the other end of which is connected by a pin 163 to one end of a link 164. The other end of link 164 is connected to one arm of a bell-crank 165, the other arm of which is connected to an arm 166 on a shaft 167 connected to the reverse lever 38'. The pin 163 extends into a slot in a link 168 of T-shape, the long leg of link 168 being connected to the core of a solenoid 169. The core of the solenoid is acted on by a return spring 170. The solenoid is supplied momentarily with current whenever the forestalling mechanism is actuated. Normally, links 162, 164 are aligned so that pencil 141 makes a straight line along the tape in one or the other of two levels, depending upon the position of the reverse lever. Whenever the forestalling mechanism is actuated, solenoid 169 is momentarily energized and this causes link 168 to be moved to the position shown in Fig. 15, so that the pencil is moved downwardly a short distance. When the solenoid is deenergized, the spring 170 moves link 168 to cause links 162, 164 to move back again into alignment. The operation of the forestalling mechanism thus causes the pencil 141 to make a short line at right angles to the direction of movement of the tape.

The piece of tape 171 shown in Fig. 16 carries typical records made by an instrument of the construction shown in Fig. 14. The line 172 on the tape is a record of current supply made by pencil 139, the pencil having been shifted stepwise transversely of the tape as the throttle was opened notch by notch. The line 173 is a record of transitions made by pencil 138. The cam 146 actuating pencil 138 was designed so that at each movement of the transition lever, the pencil was shifted to a point on the tape representing the top speed at which the motor circuit established by the transition should be used. Line 174 on the tape is a record of speed made by pencil 140, and a comparison of lines 173 and 174 shows that, whenever the speed reached the top speed permitted for a particular motor circuit, a transition was made. The line 173 shows that, when the locomotive was to be stopped, the transition lever was moved back to its initial starting position at 173*a* and thereafter the lever was moved to apply the dynamic brake, as shown by the portion 173*b* of the line. The brake was applied until the locomotive speed was reduced to about thirty-five miles per hour, and the short length 173*c* of a heavy line was formed by the throttle and transition pencils making superposed records while the locomotive was being braked to a stop, with both the throttle and the transition levers in their neutral positions. Thereafter, the locomotive was reversed and, during reverse travel, the throttle was opened three notches as indicated by line 172*b* and two transitions were made as indicated by line 173*d*.

The line 175 is a record of direction of travel and of the operation of the forestalling mechanism made by pencil 141. The portion 175*a* of the line is at a lower level than the remainder and indicates reverse travel. The short line 176 indicates the operation of the forestalling mechanism.

In the instruments so far described, the record of transitions is made by a pencil actuated mechanically by the transition lever, but the pencil can be actuated partly mechanically and partly electrically, if desired. Such a construction is illustrated in Fig. 17, in which the flexible shaft 177 connected to a pencil (not shown) for recording transitions is connected to a lever 178 attached to a quadrant gear 179 meshing with a rack 180 connected to the cores of solenoids 181, 182. The transition lever 37'' is connected to shaft 183 having an arm 184 operating a double-throw switch 185 and, when the lever is moved forwardly to effect the successive transitions, current is supplied through switch 185 to energize solenoid 181.

The shaft 183 is provided with a plurality of stops mounted in different angular positions and at different heights thereon and, when the level is moved for the first transition, stop 186*a* lies in the path of the end of lever 178. The energization of solenoid 181 causes a downward pull on rack 180, so that lever 178 moves upwardly, until the end of the lever engages stop 186*a*. The movement of lever 178 causes shaft 177 to move its pencil a step across the tape to the level of the top speed, in which the first motor circuit should be used. When the transition lever is moved to effect the next transition, stop 186*a* moves from above the end of lever 178 and the next higher stop 186*b* moves into the path of the end of the lever. The pencil carried by shaft 177, accordingly, moves another step across the tape. The stops are so arranged that, at each position of rest of the pencil, it lies at a level representing the top speed at which a particular motor circuit should be used.

When the transition lever is moved backwardly, for example, to cause a shift from the fourth motor circuit to the third, the supply of current to solenoid 181 is cut off and solenoid 182 is energized. As a result, the lever 178 is urged to swing and lower the pencil but the lever engages the stops successively from above, so that the movement of the pencil is in steps as before.

In the instrument shown in Fig. 17, a pencil (not shown) is actuated by a flexible shaft 187, which is connected to the throttle, so that the pencil records current supply. The shaft 188 is driven by a speed-responsive mechanism and a pencil (not shown) carried by the shaft records instantaneous values of speed. A pencil (not shown) carried by a shaft 189 records direction of travel and operation of the forestalling mechanism. For this purpose, the shaft is connected to a core 190 within aligned solenoids 191, 192 within casing 193. The solenoids are supplied in alternation with current from a source 194 through a switch 195 operated by the reverse lever 38''. When the reverse lever is in forward position solenoid 191 is energized and this causes shaft 189 to move upwardly to cause the pencil carried by it to move away from the bottom edge of the tape. When the reverse lever is moved for reverse operation, the solenoid 192 is energized and draws the shaft 189 and its pencil downwardly so that the pencil records in a lower level on the tape. When the reverse lever is in neutral, the pencil is in an intermediate level. The core 190 of the aligned solenoids is connected to the armature 196 of a solenoid 197, which is momentarily energized whenever the forestalling mechanism is operated. The downward movement of armature 196 produced by energization of solenoid 197 causes shaft 189 to be pulled downwardly momentarily and then released, so that the pencil operated by shaft 189 draws a short vertical line on the tape.

The length of tape 198, shown in Fig. 20, carries a typical record made by the instrument of Fig. 17. Line 199 on the tape was made by a pencil actuated by shaft 187 and is a record of current supply. Line 200 was made by a pencil carried by shaft 177 and is a record of transitions. Line 201 was made by the pencil actuated by shaft 188 and is a record of instantaneous values of speed. Line 202 was made by the pencil actuated by the shaft 189 and the portion 202a of the line is at a high level and indicates forward travel of the locomotive. Portion 202b of the line is at a low level and indicates reverse travel. Portion 202C of the line is at an intermediate level and indicates either that the locomotive was moving but not under its own power or else that, during the locomotive travel, the controls of another unit were used. The short line 203 indicates the operation of the forestalling mechanism.

Figure 21:
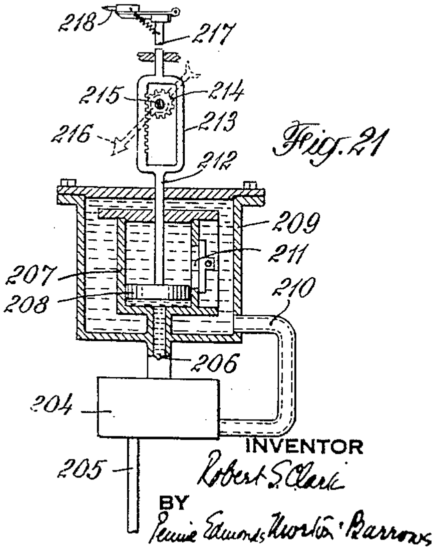
Fig. 21 is a diagrammatic view, partly in elevation and partly in section, of an alternative speed-responsive mechanism which can be used in the new instrument.
Figure 12:
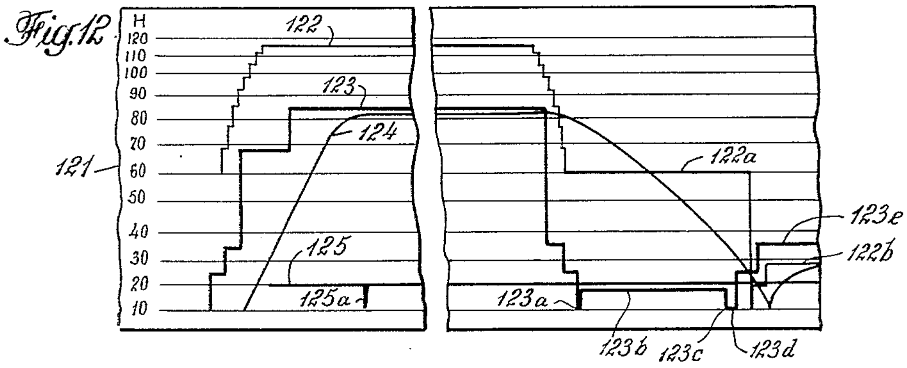
Fig. 12 is a view in plan of a typical record sheet produced by the instrument shown in Fig. 2.

In the instrument, the speed recording pencil may be actuated by means other than the centrifugal mechanism illustrated in Fig. 3 and one example of an alternative speed-responsive mechanism is shown in Fig. 21 as including a rotary pump 204 driven by a shaft 205 at a speed proportionate to the speed of the locomotive. The pump supplies fluid through a line 206 to a cylinder 207, within which is a piston 208. The cylinder is contained within a casing 209 connected by a return line 210 to the intake of the pump. The wall of the cylinder has a slot 211, through which fluid beneath the piston may escape into the casing 209 to return to the pump. A rod 212 connects the piston to a member 213 having a rack meshing with the teeth of a gear 214 on a shaft 215 carrying a pointer 216. Member 2'3 is attached to a shaft 217 on which a pencil 218 is mounted.

In the operation of the mechanism shown in Fig. 21, pump 204 delivers fluid to the cylinder 207 beneath the piston at a rate depending upon the speed of travel of the locomotive and, as the piston rises, it uncovers the slot 211 and fluid escapes from the cylinder. As a result, the piston comes to rest at a height in the cylinder dependent upon the locomotive speed. In the upward movement of the piston, the rack on member 213 causes shaft 215 to move angularly, so that pointer 216 swings through an angle depending on the speed of the locomotive. At the same time, shaft 217 is moved upwardly to elevate the pencil 218 a distance depending on the locomotive speed.

In the foregoing, I have described a form of the new instrument suitable for use on diesel-electric road locomotives, but it will be apparent that the new instrument can be used on switching locomotives, on electric locomotives receiving power from a line, on steam turbine electric locomotives, etc. The records to be made by the instrument may vary in different installations and this is accomplished by properly actuating the pencils by the devices on the locomotive, the operation of which is to be recorded.

In the specific instrument described, four pencils are employed and six records may be made by means of these pencils. For diesel-electric locomotive use, the instrument will ordinarily contain three pencils for indicating throttle actuation, transitions, and speed, and the records of direction of travel, application of the dynamic brake, and actuation of the forestalling mechanism may then be made by modifying the records produced by the three pencils. Thus, the throttle pencil may make records in upper or lower levels of the tape depending on direction of travel and the transition pencil may record application of the brake, as previously explained. The actuation of the forestalling mechanism may be recorded by modifying the records made by any of the three pencils, since the record of actuation of the forestalling mechanism involves only a momentary movement of a pencil from its normal course.

I claim:

1. In apparatus for recording the details of operation of an electrically driven locomotive having a plurality of traction motors connectable in various circuits to be employed through different speed ranges, means for effecting the motor circuit transitions, and means operable stepwise to control the supply of current to the motors, the combination of means for supporting and advancing a tape lengthwise and proportionately to the travel of the locomotive, a plurality of means for inscribing records on the tape, means responsive to the speed of the locomotive for moving one inscribing means across the tape as the locomotive speed varies, increments of transverse movement of said inscribing means representing increments of speed, and means actuated by the transition means for causing a stepwise movement of a second inscribing means across the tape, the movement of the second inscribing means being in the same units as the movement of the speed record inscribing means and the second inscribing means recording at the end of each step the top speed at which the corresponding motor circuit should be used.

2. In apparatus for recording the details of operation of an electrically driven locomotive having a plurality of traction motors connectable in different circuits, and means for effecting the motor circuit transitions, the combination of means for supporting and advancing a tape lengthwise proportionately to the travel of the locomotive, a plurality of pencils for inscribing records on the tape, means responsive to the speed of the locomotive for moving one pencil transversely of the tape as the speed of the locomotive varies, and means actuated by the transition means for moving a second pencil stepwise transversely of the tape as transitions are made, said moving means for the second pencil including a cam shaped to move the second pencil through steps of varying length corresponding to the speed ranges in which the respective motor circuits should be used, each step terminating at the top speed of the corresponding range.

3. In apparatus for indicating and recording the details of operation of an electrically driven locomotive having a plurality of traction motors connectable in different circuits and mechanism for effecting the motor circuit transitions, the combination of means for advancing a tape lengthwise proportionately to the travel of the locomotive, a scale graduated in units of speed and in corresponding speed ranges, in which respective motor circuits should be used, a pair of pointers independently movable over the scale, a plurality of pencils for inscribing records on the tape, means responsive to the speed of the locomotive for moving one of the pointers along the scale and moving one of the pencils transversely of the tape as the speed of the locomotive varies, and means actuated by the transition mechanism for moving a second pencil transversely of the tape and for moving the second pointer over the scale, the second pencil and second pointer being moved stepwise through distances corresponding to the speed ranges in which respective motor circuits should be used said second pointer indicating and said second pencil recording the top speed of the corresponding range at the end of each step.

4. In apparatus for recording the details of operation of an electrically driven locomotive having a plurality of traction motors connectable in different circuits and means for effecting transitions from one circuit to another, the combination of means for supporting and advancing a tape lengthwise and proportionately to the travel of the locomotive, the tape being subdivided transversely in units of speed, means for inscribing a record on the tape, and means actuated by the transition means and moving the inscribing means transversely of the tape in successive steps, each step being made up of a plurality of units of speed, the length of each step corresponding to the length of the range of speed, in which the motor circuit made effective by the corresponding actuation of the transition means should be used, and the inscribing means recording the top speed of the corresponding range at the end of each step.

5. In apparatus for indicating the details of operation of an electrically driven locomotive having a plurality of traction motors connectable in various circuits and means for effecting transitions from one circuit to another, the combination of a scale subdivided into ranges each extending between the bottom and top speeds, within which a particular motor circuit should be used, the speed ranges being of varying lengths and means operated by the transition means for indicating the upper end of the subdivision on the scale appropriate for the circuit established by each operation of the transition means.

6. In apparatus for indicating the details of operation of an electrically driven locomotive having a plurality of traction motors connectable in various circuits and means, including a lever operable stepwise, for effecting transitions from one circuit to another, the combination of a scale having sub-divisions each extending between the bottom and top speeds, within which a particular circuit should be used, and means operated by the transition means for indicating the top of the subdivision on the scale appropriate for the circuit established by a movement of the lever.

ROBERT S. CLARK.

REFERENCES CITED

The following references are of record in the file of this patent:

UNITED STATES PATENTS

| Number | Name | Date |
|---|---|---|
| 1,190,173 | Hudson | July 4, 1916 |
| 1,350,355 | Brach | Aug. 24, 1920 |
| 1,516,809 | Duncan | Nov. 25, 1924 |
| 1,518,214 | Murray | Dec. 9, 1924 |
| 1,826,492 | Babson | Oct. 6, 1931 |
| 2,317,258 | Dilworth | Apr. 20, 1943 |
| 2,325,451 | Wait | July 27, 1943 |
| 2,326,049 | Smith | Aug. 3, 1943 |